US009736263B2

(12) United States Patent
Royon et al.

(10) Patent No.: US 9,736,263 B2
(45) Date of Patent: Aug. 15, 2017

(54) TEMPORAL CACHING FOR ICN

(71) Applicant: Telefonaktiebolaget L M Ericsson (publ), Stockholm (SE)

(72) Inventors: Yvan Royon, San Jose, CA (US); Hari Rangarajan, San Jose, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 188 days.

(21) Appl. No.: 14/623,384

(22) Filed: Feb. 16, 2015

(65) Prior Publication Data
US 2016/0241669 A1    Aug. 18, 2016

(51) Int. Cl.
*H04L 29/08* (2006.01)
(52) U.S. Cl.
CPC .......... *H04L 67/2847* (2013.01); *H04L 67/10* (2013.01); *H04L 67/1095* (2013.01); *H04L 67/327* (2013.01)

(58) Field of Classification Search
None
See application file for complete search history.

(56) References Cited

U.S. PATENT DOCUMENTS

| | | | | |
|---|---|---|---|---|
| 6,321,264 B1 * | 11/2001 | Fletcher | ............... | H04L 12/24 370/252 |
| 6,856,812 B1 * | 2/2005 | Budka | ............... | H04W 52/20 370/318 |
| 7,612,805 B2 * | 11/2009 | Solomon | ............ | G02B 27/0025 348/208.11 |
| 8,014,397 B1 * | 9/2011 | Zaghloul | ............... | H04L 43/028 370/389 |
| 9,317,537 B2 * | 4/2016 | Fakeih | ............. | G06F 17/30289 |
| 2002/0129220 A1 * | 9/2002 | Fields, Jr. | ........... | G06F 12/0811 711/216 |

(Continued)

FOREIGN PATENT DOCUMENTS

EP    2874075 A1    5/2015

OTHER PUBLICATIONS

"CCNx Synchronization Protocol," downloaded from https://www.ccnx.org/releases/latest/doc/technical/SynchronizationProtocol.html on Oct. 23, 2014, last updated Jul. 23, 2013, 7 pages.

(Continued)

*Primary Examiner* — Ninos Donabed
(74) *Attorney, Agent, or Firm* — Nicholson, De Vos, Webster & Elliot, LLP

(57) ABSTRACT

A method provides temporal caching in a content centric networking (CCN) network. The temporal caching is implemented by a CCN node. The method fetches and caches a group of content objects having a temporal relationship. The method includes selecting a first CCN interest packet including a first CCN name of a first content object from the group of content objects, adding an entry for the first CCN name to a correlation table, and selecting at least a second CCN interest packet including a second CCN name of a second content object from the group of content objects. The method further includes correlating the second CCN name with the first CCN name by determining a request sequence for the first content object and the second content object, and updating the entry to correlate the first CCN name with the second CCN name.

19 Claims, 8 Drawing Sheets

(56) References Cited

U.S. PATENT DOCUMENTS

| | | | | |
|---|---|---|---|---|
| 2003/0109274 | A1* | 6/2003 | Budka | H04W 52/24 455/522 |
| 2004/0203981 | A1* | 10/2004 | Budka | H04W 52/265 455/522 |
| 2004/0218567 | A1* | 11/2004 | Budka | H04L 1/0003 370/332 |
| 2011/0078141 | A1* | 3/2011 | Fakeih | G06F 17/30536 707/736 |
| 2011/0161665 | A1* | 6/2011 | Perez | H04L 29/12028 713/161 |
| 2012/0124318 | A1* | 5/2012 | Bivens | G06F 11/3409 711/170 |
| 2013/0185406 | A1 | 7/2013 | Choi et al. | |
| 2013/0318305 | A1* | 11/2013 | Bivens | G06F 11/3409 711/134 |
| 2014/0033746 | A1 | 2/2014 | McSweeney | |
| 2014/0101761 | A1* | 4/2014 | Harlacher | H04L 63/1425 726/23 |
| 2015/0095481 | A1 | 4/2015 | Ohnishi et al. | |
| 2015/0172413 | A1 | 6/2015 | Yoneda et al. | |
| 2015/0256460 | A1* | 9/2015 | Mosko | H04L 45/748 370/392 |
| 2015/0372873 | A1* | 12/2015 | Mahadevan | H04L 41/145 370/255 |
| 2016/0182351 | A1* | 6/2016 | Wang | H04L 49/00 709/223 |

OTHER PUBLICATIONS

"The CCNx Project," PARC's implementation of content-centric networking, Palo Alto Research Center, Inc. downloaded from http://blogs.parc.com.ccnx/ on May 11, 2016, 1 page.

Dunham, et al., "A Survey of Association Rules," http://www.2.cs.uh.edu/-ceick/6340/grue-assoc.pdf, Jan. 2001, 65 pages.

Lin, J., "N-Gram Language Models," CMSC 723: Computational Linguistics I—Session #9, http://www.umiacs.umd.edu/-jimmulin/CMSC723-2009-Fall/session9-slides.pdf, Oct. 28, 2009, 48 pages.

Nichols, et al., "Definition of the Differentiated Services Field (DS Field) in the IPv4 and IPv6 Headers," Network Working Group, Request for Comments: 2474, The Internet Society, Dec. 1998, 20 pages.

Rossini, et al., "Multi-Terabyte and Multi-Gbps Information Centric Routers," IEEE Infocom 2014, IEEE conference on Computer Communications, Apr. 27, 2014, pp. 181-189.

Ali, Z., et al., "Node-IDS Based Resource Reservation Protocol (RSVP) Hello: A Clarification Statement", Network Working Group; RFC 4558, The Internet Society, (Jun. 2006), 7 pages.

Andersson, L., et al., "LDP Specification", Network Working Group, Request for Comments: 5036, The EITF Trust, (Oct. 2007), 135 pages.

Awduche, D., et al., "RSVP-TE: Extensions to RSVP for LSP Tunnels", Network Working Group, Request for Comments: 3209, The Internet Society, http://tools.ietf.org/html/rfc3209, (Dec. 2001), 61 pages.

Babiarz, J., et al., "Configuration Guidelines for DiffServ Service Classes", Network Working Group, Request for Comments: 4594, The Internet Society, (Aug. 2006), 57 pages.

Baker, F., "A Differentiated Services Code Point (DSCP) for Capacity-Admitted Traffic", Internet Engineering Task Force (IETF), Request for Comments: 5865, IETF Trust, (May 2010), 14 pages.

Baker, F., et al., "Management Information Base for the Differentiated Services Architecture", Network Working Group, Request for Comments: 3289, The Internet Society, (May 2002), 116 pages.

Berger, L., "Generalized Multi-Protocol Label Switching (GMPLS) Signaling Resource ReserVation Protocol-Traffic Engineering (RSVP-TE) Extensions", Network Working Group, Request for Comments: 3473, The Internet Society, http://tools.ietf.org/html/rfc3473, (Jan. 2003), 42 pages.

Bernet, Y., et al., "An Informal Management Model for Diffserv Routers", Network Working Group, Request for Comments: 3290, The Internet Society, (May 2002), 56 pages.

Black, D., "Differentiated Services and Tunnels", Network Working Group, Request for Comments: 2983, The Internet Society, (Oct. 2000), 14 pages.

Black, D., et al., "Per Hop Behavior Identification Codes", Network Working Group, Request for Comments: 3140, The Internet Society, (Jun. 2001), 8 pages.

Blake, S., et al., "An Architecture for Differentiated Services", Network Working Group, Request for Comments 2475, The Internet Society, (Dec. 1998), 36 pages.

Borman, D., et al., "IPv6 Jumbograms", Network Working Group, Request for Comments: 2675, The Internet Society, (Aug. 1999), 9 pages.

Braden, R., et al., "Resource ReSerVation Protocol (RSVP) Version 1 Functional Specification", Network Working Group, Request for Comment: 2205, (Sep. 1997), 112 pages.

Chan, K., et al., "Differentiated Services Quality of Service Policy Information Base", Network Working Group, Request for Comments: 3317, The Internet Society, (Mar. 2003), 96 pages.

Charny, A., et al., "Supplemental Information for the New Definition of the EF PHB (Expedited Forwarding Per-Hop Behavior)", Network Working Group, Request for Comments: 3247, The Internet Society, (Mar. 2002), 24 pages.

Coltun, R., et al., "OSPF for IPv6", Network Working Group, Request for Comments: 5340, The IETF Trust, (Jul. 2008), 94 pages.

Davie, B., et al., "An Expedited Forwarding PHB (Per-Hop Behavior)", Network Working Group, Request for Comments: 3246, The Internet Society, (Mar. 2002), 16 pages.

Deering, S., et al., "Internet Protocol, Version 6 (IPv6) Specification", Network Working Group, Request for Comments: 2460, The Internet Society, (Dec. 1998), 39 pages.

Eggert, L., et al., "Unicast UDP Usage Guidelines for Application Designers", Network Working Group, Request for Comments: 5405, IETF Trust and the persons identified as the document authors, (Nov. 2008), 27 pages.

Fenner, B., et al., "Management Information Base for the User Datagram Protocol (UDP)", Network Working Group, Request for Comments: 4113, The Internet Society, (Jun. 2005), 19 pages.

Grossman, D., "New Terminology and Clarifications for Diffserv", Network Working Group, Request for Comments: 3260, The Internet Society, (Apr. 2002), 10 pages.

Hedrick, C., "Routing Information Protocol", Network Working Group, Request for Comments: 1058, (Jun. 1988), 33 pages.

Heinanen, J., et al., "Assured Forwarding PHB Group", Network Working Group, Request for Comments: 2597, The Internet Society, (Jun. 1999), 11 pages.

Housley, R., "Using Advanced Encryption Standard (AES) CCM Mode with IPsec Encapsulating Security Payload (ESP)", Network Working Group, Request for Comments: 4309, The Internet Society, (Dec. 2005), 13 pages.

Information Sciences Institute, University of Southern C., "Transmission control protocol darpa internet program protocol specification", Request for Comments: 793, (Sep. 1981), 91 pages.

Kent, S., et al., "Security Architecture for the Internet Protocol", Network Working Group, Request for Comments: 4301, The Internet Society, (Dec. 2005), 101 pages.

Kompella, K., et al., "Procedures for Modifying the Resource reSerVation Protocol (RSVP)", Network Working Group; RFC 3936, The Internet Society, (Oct. 2004), 7 pages.

Malkin, G., "RIP Version 2", Network Working Group, Request for Comments: 2453, The Internet Society, (Nov. 1998), 39 pages.

Malkin, G., et al., "RIPng for IPv6", Network Working Group; RFC 2080, (Jan. 1997), 19 pages.

Moy, J., "OSPF Version 2", Network Working Group, Request for Comments: 2328, The Internet Society, (Apr. 1998), 244 pages.

Nichols, K., et al., "Definition of Differentiated Services Per Domain Behaviors and Rules for their Specification", Network Working Group, Request for Comments: 3086, The Internet Society, (Apr. 2001), 24 pages.

(56) References Cited

OTHER PUBLICATIONS

Oran, David, "OSI ISIS Intradomain Routing Protocol", Network Working Group, Request for Comments: 1142, (Feb. 1990), 157 pages.
Polk, J., et al., "A Resource Reservation Protocol (RSVP) Extension for the Reduction of Bandwidth of a Reservation Flow", Network Working Group; RFC 4495, The Internet Society, (May 2006), 21 pages.
Postel, J., "User Datagram Protocol", RFC 768, (Aug. 28, 1980), 3 pages.
Rekhter, Y., et al., "A Border Gateway Protocol 4 (BGP-4)", Network Working Group, Request for Comments: 4271, The Internet Society, (Jan. 2006), 104 pages.
Rosen, E., et al., "BGP/MPLS IP Virtual Private Networks (VPNs)", Network Working Group, Request for Comment: 4364, The Internet Society, (Feb. 2006), 47 pages.
Shenker, S., et al., "Specification of Guaranteed Quality of Services", Network Working Group; RFC 2212, (Sep. 1997), 20 pages.
Socolofsky, T., et al., "A TCP/IP Tutorial", Network Working Group, Request for Comments: 1180, (Jan. 1991), 28 pages.
Wroclawski, J., "Specification of the Controlled-Load Network Element Service", Network Working Group, Request for Comments: 2211, (Sep. 1997), 19 pages.
Wroclawski, J., "The Use of RSVP with IETF Integrated Services", Network Working Group, Request for Comments: 2210, (Sep. 1997), 33 pages.
"CCNx Synchronization Protocol", https://www.ccnx.org/releases/latest/doc/technical/SynchronizationProtocol.html; 7 pages.
"N-Gram Language Models", http://www.umiacs.umd.edu/-jimmulin/CMSC723-2009-Fall/session9-slides.pdf.
Dunham, Margaret, et al., "A Survey of Association Rules", http://www.2.cs.uh.edu/-ceick/6340/grue-assoc.pdf; 65 pages.
Mosko, Marc, "CCNx 1.0 Collection Synchronization with Secure Catalogs", http://www.ccnx.org/pubs/hhg/4.6 CCNx_1.0_Collection_Synchronization_with_Secure_Catalogs.pdf; Jan. 27, 2014; 2 pages.

* cited by examiner

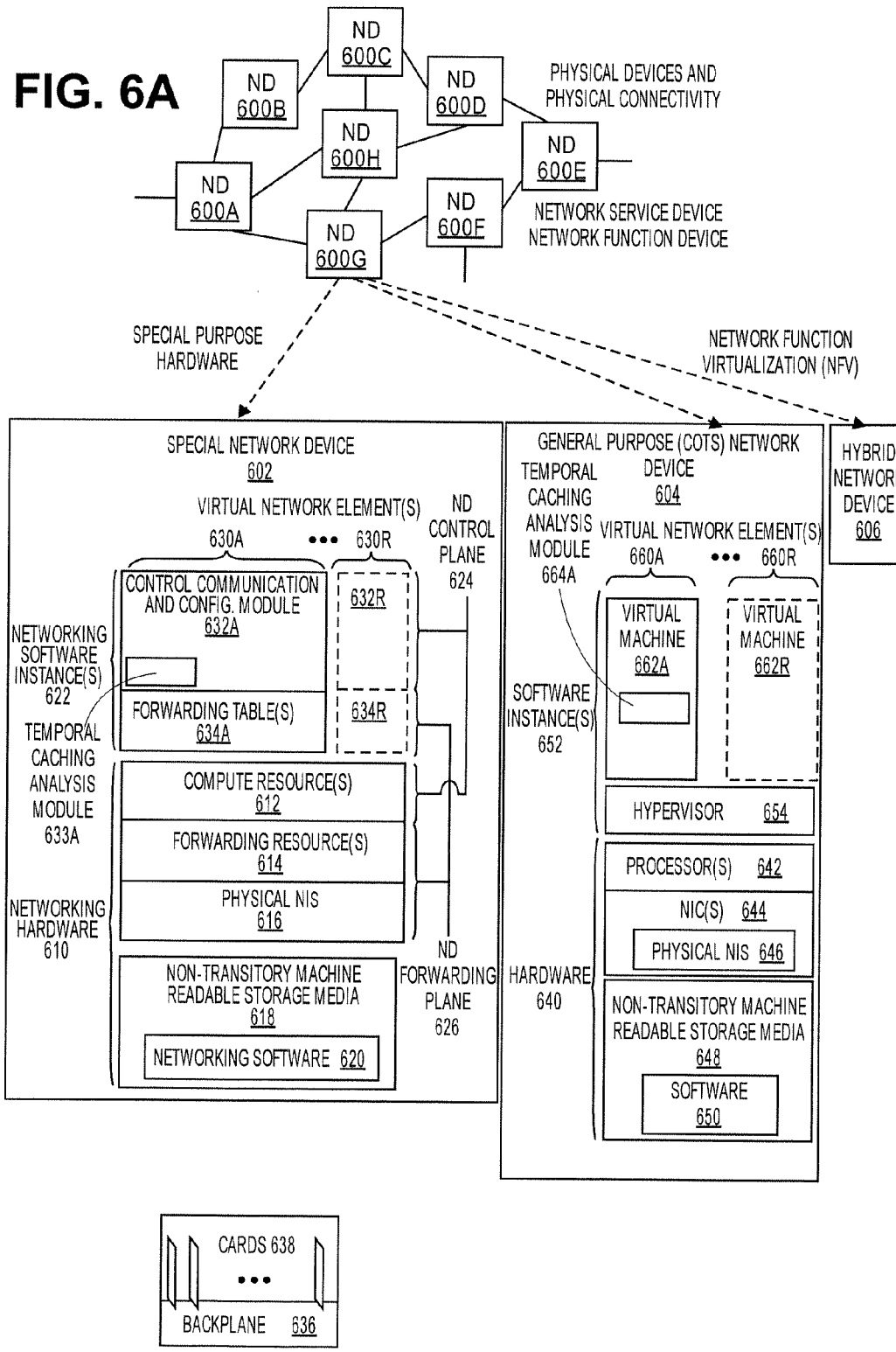

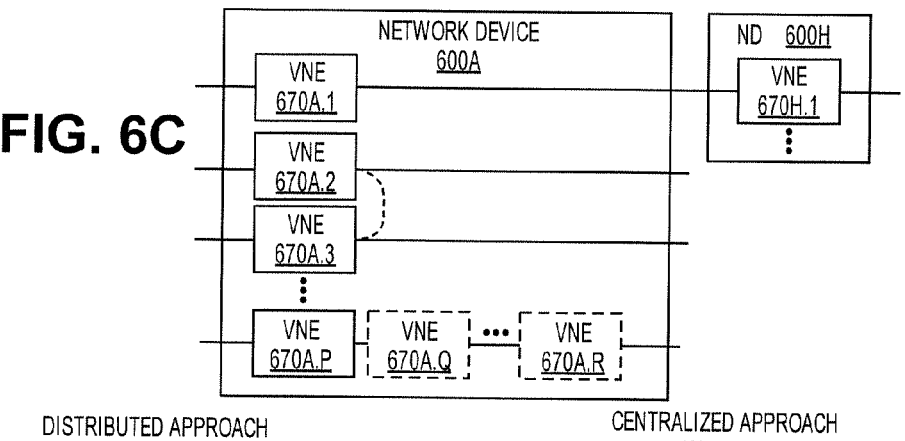
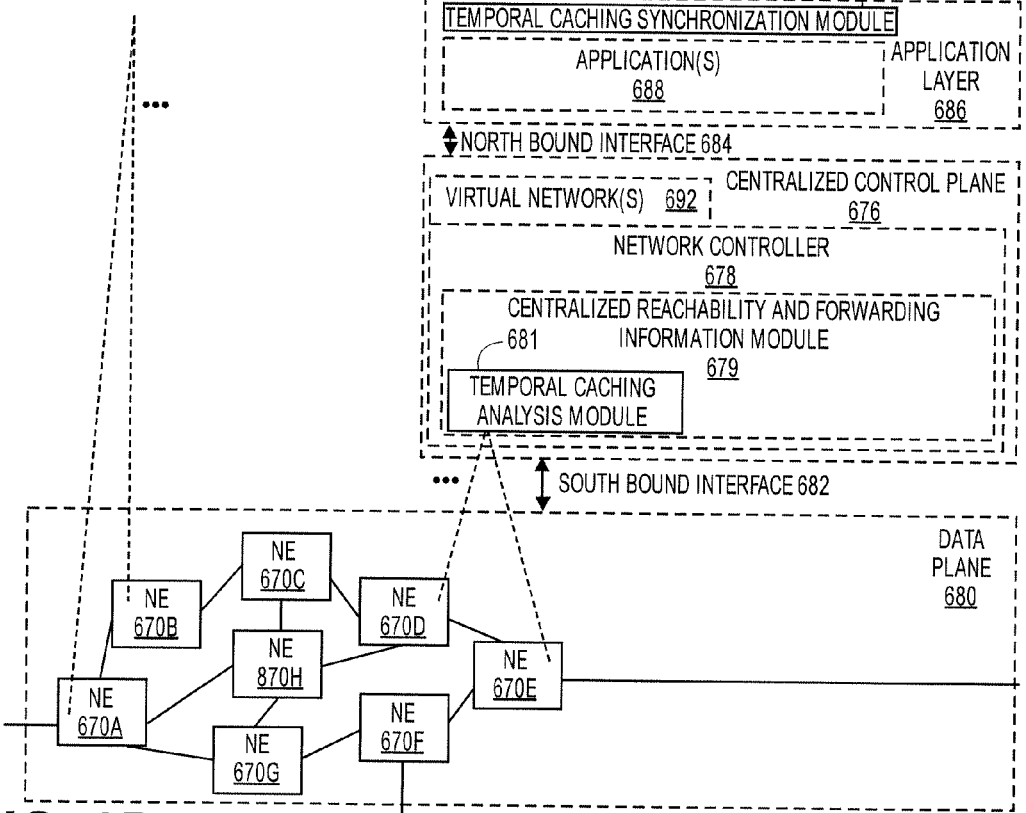
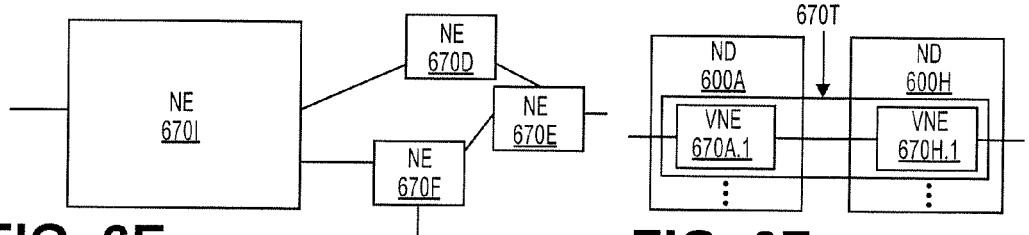

TEMPORAL CACHING FOR ICN

FIELD

Embodiments of the invention relate to accessing content, in the form of a content object, in information centric networking (ICN) networks such as content centric networking (CCN) networks. Specifically, the embodiments relate to a method and system implemented by a content centric networking (CCN) gateway to provide temporal caching of content objects.

BACKGROUND

An ICN network is a conceptualization of a networking protocol stack, in particular layers 3 and above of a networking protocol stack. The CCN network as well as similar networks like named data networking (NDN) networks are particular architectures and implementations of an ICN network. ICN, CCN, and NDN networks are based on the premise of naming resources in these networks. In particular, the naming relates to the use of a globally shared namespace for objects that allows entities in these networks to retrieve any content of interest. NDN networks and CCN networks have similar architectures, and for sake of clarity, examples related to CCN networks are discussed herein below.

Thus, within a CCN network, a name is utilized to identify a content object instead of an Internet Protocol (IP) address of the host of the content. In an IP network, routing is based on host names (e.g., source and destination addresses). In a CCN network by contrast, routing is based on a uniform resource identifier (URI) or similar identifier for a content object. CCN routing is performed hop-by-hop, using longest prefix matching on the CCN name. All communications seeking to access data are framed as a request and response transaction. A CCN client (e.g., executed by user equipment) sends a message referred to as a CCN interest packet to the nodes in the CCN network. The nodes of the CCN network respond with a Content object identified by a CCN name in the CCN interest. These Content objects are returned via a CCN response.

All content object packets are cryptographically signed by their initial provider. A CCN client can thus verify the integrity and authenticity of the content even if the packet comes from untrusted links or untrusted hosts. As a direct effect, CCN nodes in the CCN network are allowed to cache packets locally in a table called the content store. When a CCN node receives a CCN interest packet, the CCN node can check whether its local content store has the requested Content object and, if so, can send the Content object to the requesting CCN client. The look up in the content store is by the CCN name. If the CCN name is not found in the local content store, then the CCN interest is forwarded according to entries for the CCN name in a forwarding information base (FIB) of the CCN node. This type of caching of content objects is referred to as spatial caching, because it makes the content object available closer to the user or device that requests the content object.

SUMMARY

A method provides temporal caching in a content centric networking (CCN) network. The temporal caching is implemented by a CCN node. The method fetches and caches a group of content objects having a temporal relationship. The method includes selecting a first CCN interest packet including a first CCN name of a first content object from the group of content objects, adding an entry for the first CCN name to a correlation table, and selecting at least a second CCN interest packet including a second CCN name of a second content object from the group of content objects. The method further includes correlating the second CCN name with the first CCN name by determining a request sequence for the first content object and the second content object, and updating the entry to correlate the first CCN name with the second CCN name.

A network device implements a method for providing temporal caching in a content centric networking (CCN) network. The network device implements a CCN node. The method fetches and caches a group of content objects having a temporal relationship. The network device includes a non-transitory computer-readable medium having stored therein a temporal caching analysis module, and a processor coupled to the non-transitory computer-readable medium. The processor is configured to execute the temporal caching analysis module. The temporal caching analysis module is configured to select a first CCN interest packet including a first CCN name of a first content object from the group of content objects, to add an entry for the first CCN name to a correlation table, to select at least a second CCN interest packet including a second CCN name of a second content object from the group of content objects, to correlate the second CCN name with the first CCN name by determining a request sequence for the first content object and the second content object, and to update the entry to correlate the first CCN name with the second CCN name.

A computing device executes a plurality of virtual machines for implementing network function virtualization (NFV), wherein a virtual machine from the plurality of virtual machines is configured to execute a method for providing temporal caching in a content centric networking (CCN) network. The network device implements a CCN node. The method fetches and caches a group of content objects having a temporal relationship. The computing device includes a non-transitory computer-readable medium having stored therein a temporal caching analysis module, and a processor coupled to the non-transitory computer-readable medium. The processor is configured to execute the virtual machine. The virtual machine is configured to execute the temporal caching analysis module. The temporal caching analysis module is configured to select a first CCN interest packet including a first CCN name of a first content object from the group of content objects, to add an entry for the first CCN name to a correlation table, to receive at least a second CCN interest packet including a second CCN name of a second content object from the group of content objects, to correlate the second CCN name with the first CCN name by determining a request sequence for the first content object and the second content object, and to update the entry to correlate the first CCN name with the second CCN name.

A control plane device implements a control plane of a software defined networking (SDN) network. The SDN network includes a plurality of network devices implementing the data plane of the SDN network, wherein control plane device is configured to execute a method for providing temporal caching in a content centric networking (CCN) network. The method fetches and caches a group of content objects having a temporal relationship. The control plane device includes a non-transitory computer-readable medium having stored therein a temporal caching analysis module, and a processor coupled to the non-transitory computer-readable medium. The processor is configured to execute the temporal caching analysis module. The temporal caching analysis module is configured to select a first CCN interest packet including a first CCN name of a first content object from the group of content objects, to add an entry for the first CCN name to a correlation table, to select at least a second CCN interest packet including a second CCN name of a second content object from the group of content objects, to correlate the second CCN name with the first CCN name by determining a request sequence for the first content object and the second content object, and to update the entry to correlate the first CCN name with the second CCN name.

BRIEF DESCRIPTION OF THE DRAWINGS

The invention may best be understood by referring to the following description and accompanying drawings that are used to illustrate embodiments of the invention. In the drawings:

FIG. 6A illustrates connectivity between network devices (NDs) within an exemplary network, as well as three exemplary implementations of the NDs, according to some embodiments of the invention.

FIG. 6B illustrates an exemplary way to implement the special-purpose network device according to some embodiments of the invention.

FIG. 6C illustrates various exemplary ways in which virtual network elements (VNEs) may be coupled according to some embodiments of the invention.

FIG. 6D illustrates a network with a single network element (NE) on each of the NDs of FIG. 6A.

FIG. 6E illustrates an example where each of the NDs implements a single NE (see FIG. 6D), but the centralized control plane has abstracted multiple of the NEs in different NDs into a single NE in one of the virtual network(s) of FIG. 6D, according to some embodiments of the invention.

FIG. 6F illustrates a case where multiple VNEs are implemented on different NDs and are coupled to each other, and where the centralized control plane has abstracted these multiple VNEs such that they appear as a single VNE within one of the virtual networks of FIG. 6, according to some embodiments of the invention.

DETAILED DESCRIPTION

The following description describes methods and apparatus for implementing temporal caching at a content centric networking (CCN) gateway by analyzing sequences of requests for content objects via CCN interest packets. The CCN gateway implements a temporal caching analysis module that tracks the content objects being requested and identifies sequences of these requests. A correlation table is then constructed that stores the identified sequences of content object requests. In response to receiving a request for one of the content objects identified in the CCN interest packet, the CCN gateway can pre-fetch the correlated content objects, thereby providing a temporal caching of these pre-fetched correlated content objects.

References in the specification to "one embodiment," "an embodiment," "an example embodiment," etc., indicate that the embodiment described may include a particular feature, structure, or characteristic, but not every embodiment may necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Information Centric Networks

Figure 1:
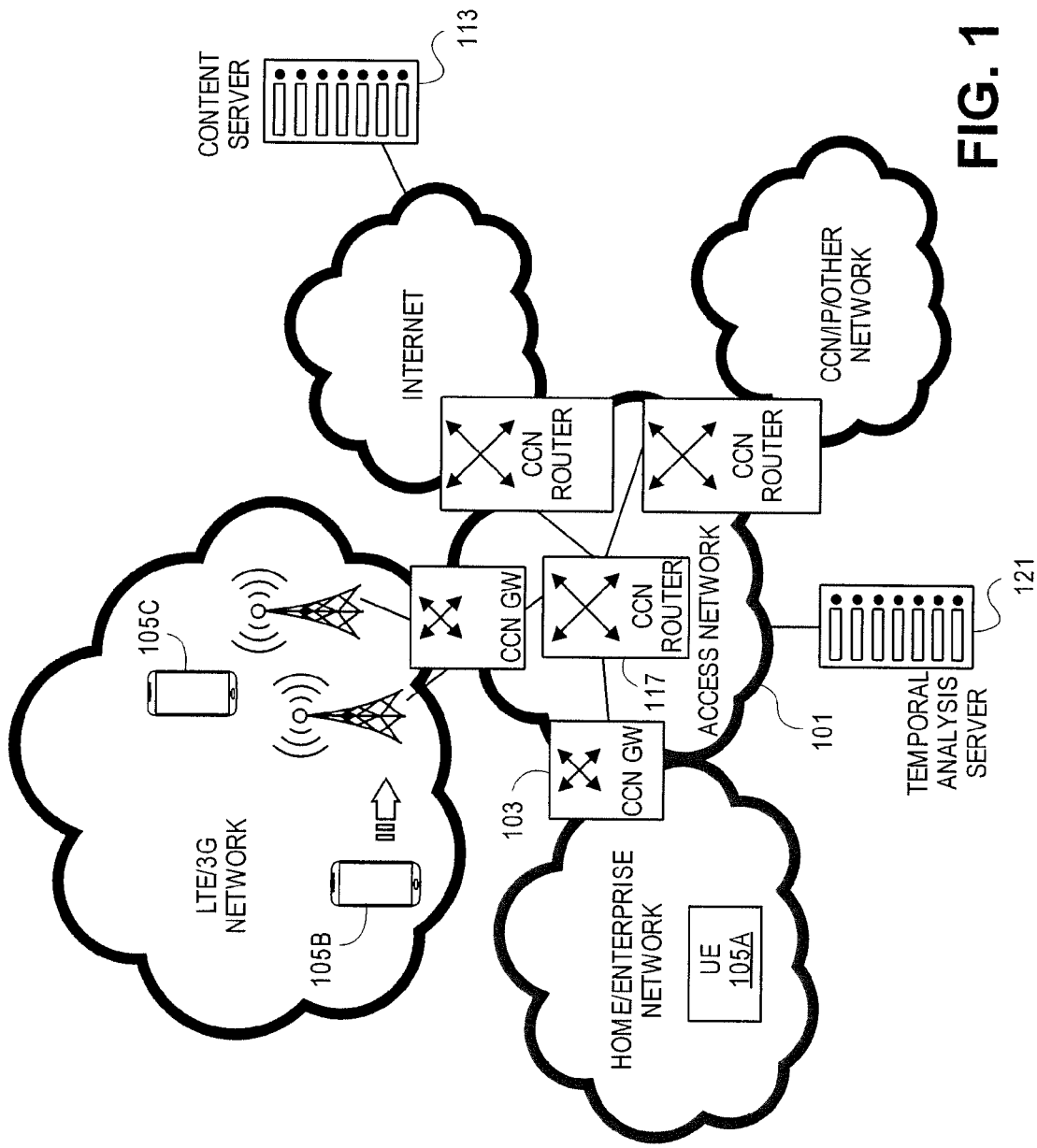
FIG. 1 is a diagram of one embodiment of a CCN network including placement of CCN gateways, CCN routers and content servers in the CCN network.

FIG. 1 is a diagram of one example of an architecture of a content centric networking (CCN) network. The CCN network in this example is an access network 101. The access network 101 is in communication with a set of separately administered networks including a home/enterprise network, the Internet and an LTE/3G mobile network. The example shows that the access network can be further in communication with any number of additional CCN networks, IP networks or other types of networks. In this example, the access network implements the temporal caching analysis described further herein below and is provided by way of example and not limitation. A CCN network can be utilized in other contexts such as home networks, enterprise networks, or similar independently administered public or private networks.

The access network can have any number of nodes and can utilize any combination of layer 1 and layer 2 protocols for communication between the CCN nodes of the access network 101. For sake of clarity, the nodes implementing the temporal caching analysis are shown and described. The CCN nodes may be implemented by network devices (ND), as discussed further herein below. The CCN nodes include a set of CCN routers 117 and CCN gateways (GW) 103. The CCN routers 117 and CCN gateways 103 manage CCN interest packets, forwarding these packets toward the corresponding content server 113 and managing the content response messages by forwarding them toward the requesting user equipment 105A-C.

The CCN nodes that communicate with the user equipment 105A-C in the separately administered networks are the CCN gateways 103. The user equipment 105A-C can be any type of user device including mobile devices, laptop computers, desktop computers, console devices, workstations and similar computing devices. The CCN gateways 103 identify users of the user equipment 105A-C and apply the temporal caching analysis processes for managing access to Content objects between the user equipment 105A-C and content servers 113.

The content server 113 can be any computing device in communication with the access network 101. The access network 101 can be in communication with any number and variety of content servers 113. The content server 113 can be a server or similar computing device that hosts a set of services and resources such as data stores including web pages, audio/visual content, documents and similar static and/or dynamically generated data.

A temporal analysis server 121 can be in communication with the access network 101. The temporal analysis server 121 manages the tracking of requests for content objects provided by each of the CCN nodes including the CCN gateways 103 and CCN routers 117. In some embodiments, the temporal analysis server 121 correlates the requests for content objects into sequences in a central correlation table using any correlation algorithm such as association rules or n-gram model. The temporal analysis server 121 can also manage synchronization of correlation table data across the set of CCN nodes. As discussed further herein below, the correlation table data can be processed in a distributed hierarchical process with the centralized processing of the temporal analysis server 121 serving as the root or highest level of this hierarchy. The CCN nodes 103 and 117 in some embodiments implement aspects of the distributed correlation table construction and synchronization.

The basic data traffic forwarding in CCN is typically performed at each CCN node as explained below with an example sequence:

1. A CCN interest packet arrives through a network interface.
2. The CCN node checks whether it has the requested content object named in the CCN interest packet stored in its content store (CS).
3. If the Content object is found in the CS, then the process proceeds to step 7.
4. If the Content object is not found in the CS, then a check is made whether the same content has already been requested, by looking for an entry in a pending interest table (PIT) that matches the CCN name of the content object.
5. If a matching PIT entry is found, then the matching PIT entry is updated by adding a reference to (e.g., an indicator/identifier for) the network interface through which the CCN interest packet was received. In this case, the process then exits.
6. If no matching PIT entry is found, then a new entry is created in the PIT for the CCN name, and the CCN interest packet is forwarded toward the content server according to CCN name prefix matching using the FIB.
7. When a Content object arrives through a network interface in a CCN response packet, then the CCN response packet is forwarded to each of the network interfaces listed (e.g., referenced, identified) in the related PIT entry. If the Content object was found in the content store, then the content object is forwarded to the network interface over which the corresponding CCN interest packet was received.

Temporal Caching

The embodiments described herein present a process by which CCN nodes and CCN networks can incorporate 'temporal' caching to complement the implicit 'spatial' caching mechanism already present in these nodes and the network as a whole. The embodiments achieve the temporal caching by determining patterns of access for a group of content objects with respect to time and consolidating these patterns into a correlation table i.e., using association and causation rules. Such a correlation table may also be explicitly provided by the original content generator to help aid user experience of their content. For instance, the correlation information can come from a CCN manifest that lists all content objects related to a specific CCN name.

In CCN, streamed information is often published as chunks of content, i.e., as a set of content objects. A few simple examples that are commonly seen in day-to-day usage follow as:

1) Video stream.

CCN names:

/prefix/myvideo/time/1,

/prefix/myvideo/time/2,

/prefix/myvideo/time/N

2) File object.

CCN names:

/prefix/myfile/bytechunk/1,

/prefix/myfile/bytechunk/2,

/prefix/myfile/bytechunk/N

In these simple cases, CCN content-based access requests will naturally be expected to follow a sequential pattern 1→2→ . . . →N for streamed objects. Even for objects which are not strictly streamed, smaller repetitive patterns are bound to occur for: web pages, enterprise file backup and similar sets of content objects. The embodiments herein identify these 'temporal' patterns that will be repetitive in the CCN network, and by inferring and caching them, the embodiments can perform 'temporal' caching for CCN in addition to the existing 'spatial' caching. Requests for Content objects that do not share topology do not benefit from spatial caching. However, if knowledge of correlation of content object accesses with respect to time is tracked and/or shared across the network, then subsequent accesses to the group of content objects can be expedited by pre-populating caches near requesting user equipment.

Correlation Tables

The embodiments described herein include a correlation engine referred to herein as a temporal caching analysis module that performs analysis on user access to content objects and streams of such content objects. The temporal caching analysis module builds correlation tables at the edge of the network. These correlation tables are then consolidated via reinforcement (or similar techniques) to build a central correlation table for content. The correlation tables are disseminated locally via a special routing path that allows quick access to the tables at the edge and allows the system to scale. An example of a correlation table is presented below as Table I.

TABLE I

| Content Object Requested | Content Objects Pre-Fetched |
|---|---|
| C1 | C2, C3, C4 |
| C2 | C3, C4, C5 |
| C3 | C4, C5, C6 |
| C4 | C5, C6, C7 |
| C5 | C6, C7, C8 |
| C6 | C7, C8, C9 |

Table I is an example of a 3-look-ahead correlation table built for a stream of content objects [C1 . . . C9]. A CCN node handling an incoming request for C1 may choose to pre-fetch content objects C2, C3, and C4. A subsequent request for C2 will be responded to from the cache; this will in turn trigger new pre-fetching for C5 given that C3 and C4 were previously cached. It is easy to see that an N-look-ahead table can pre-fetch and buffer up to N content objects that can be served instantaneously or virtually instantaneously.

TABLE II

| Content Objects Requested | Content Objects Pre-Fetched |
|---|---|
| C1, C2, C3 | C4, C5 |
| C5, C6 | C7, C8, C9 |

It is also possible that the association rules result in many to many mappings, as shown in Table II. In this example, receiving a request for any of the content objects in the left hand column results in the pre-fetching by the CCN node of all of the content objects in the right hand column where each row is a correlation table entry.

Many techniques can be used for building content correlation tables. The embodiments are compatible and encompass any of these techniques, however, for sake of illustration, two such techniques are described herein below to illustrate the feasibility of the embodiments, namely the use of association rules and n-gram models.

Association rules are a technique that can be used in data mining for various application domains, spanning retail purchases to online web activity, for example. Given a number of individual transactions of a set of items, rules can be interpreted that may imply a causal relationship. A 'set,' as used herein, refers to any whole number of items including a single item. A set can also be defined using brackets { }. For example, the sets {bread, eggs, milk}, {bread, butter, milk}, {eggs, beer, milk, butter} may imply a bread to milk association rule, indicating that customers tend to buy bread and milk together.

The same concepts can be used for associating content objects in a CCN network. Because CCN end-user requests can be open-ended, each transaction will be a window of time from the start of a request. As a simple example, a series of requests {C1, C2, C3, C4, . . . } over a time window, will be considered as a series of transactions {C1, C2, C3, C4}, {C2, C3, C4, . . . }, {C3, C4, . . . }, {C4, . . . } (the ellipsis is used to indicate requests that may exist in subsequent windows but fall outside the time window for transaction 1). Using this technique or similar techniques, it is possible to build a correlation table by creating association patterns from the content transactions.

More complex association rules can be built using the same algorithms by associating more parameters to each transaction. As an illustrative example, interactive content access (i.e., web pages of different languages) may differ across geographical domains. By associating such information with each content access, it is possible for the rules to diverge based on geography. Using the web-page example, users may first arrive at an index webpage C1 which may lead to (C2, Country1) or (C20, Country 20). By parameterizing this additionally into the content object access patterns, more complex and effective correlation can be done.

An n-gram model is a type of probabilistic language model for predicting the next item in a sequence in the form of a (n−1)-order Markov model. This model can be used in natural language processing (NLP) techniques and maps directly to the problem of building correlation tables for CCN content. In NLP, a text corpus is used to build a joint probability distribution of the words. From the joint-probability distribution, it is possible to infer word emission probabilities. An illustrative example assumes there is a text corpus of 3 lines:
 1) This is a line of text
 2) This is a line of characters
 3) This is a line of text In this example analogous process, the technique seeks to determine what follows "This is a line of _____" in this sequence. In this case a conditional probability is P(_____ | "this" "is" "a" "line" "of") where _____ is the set of occurrences in the text corpus.

Continuing this Example Case:
 P("text" | "this" "is" "a" "line" "of")=2/3
 P("characters" | "this" "is" "a" "line" "of")=1/3

This is usually the basis for prediction in NLP of what the next word may be in a sentence. This technique can map this concept from the NLP model to content object request predictions. In these embodiments, each unique CCN name (or hash) can be treated as equivalent to a word in a sentence, where a sentence is a sequence of content objects that are requested in a stream by user equipment. The set of all user sequences provides a "content corpus" from which an n-gram joint probability distribution can be built.

After building the n-gram model, it is possible to now have conditional emission probabilities P(C/C1, C2, . . . , Cn), where C is the content which is expected, and C1, . . . , Cn are the previous n-objects that were seen on a user-stream.

TABLE III

| Content Object Requested | Content Objects Pre-Fetched |
|---|---|
| C1, C2, C3 | C4, C5, C6 |
| C2, C3, C4 | C5, C6, C7 |

Continuing this Example Case:

An n-gram correlation table can be built as above in Table III. The meaning of this example table is that the conditional probabilities of P(C4|C1, C2, C3), P(C5|C1, C2, C3), P(C6|C1, C2, C3) indicate a high probability that C4 or C5 or C6 will be requested immediately or virtually immediately after a sequence of C1, C2, C3.

TABLE IV

| Content Objects Requested | Content Object Pre-Fetched |
|---|---|
| C1, C2, C3 | C4 |

In contrast, the example of Table IV would indicate only P(C4|C1, C2, C3) is significant amongst every other entry. There are many different ways to create these correlation table entries once an n-gram model is built from the user request sequences, for example: (1) Pick N highest probabilities, (2) Pick only probabilities which exceed a minimum threshold, or (3) Mix and match of (1, 2).

Figure 2:
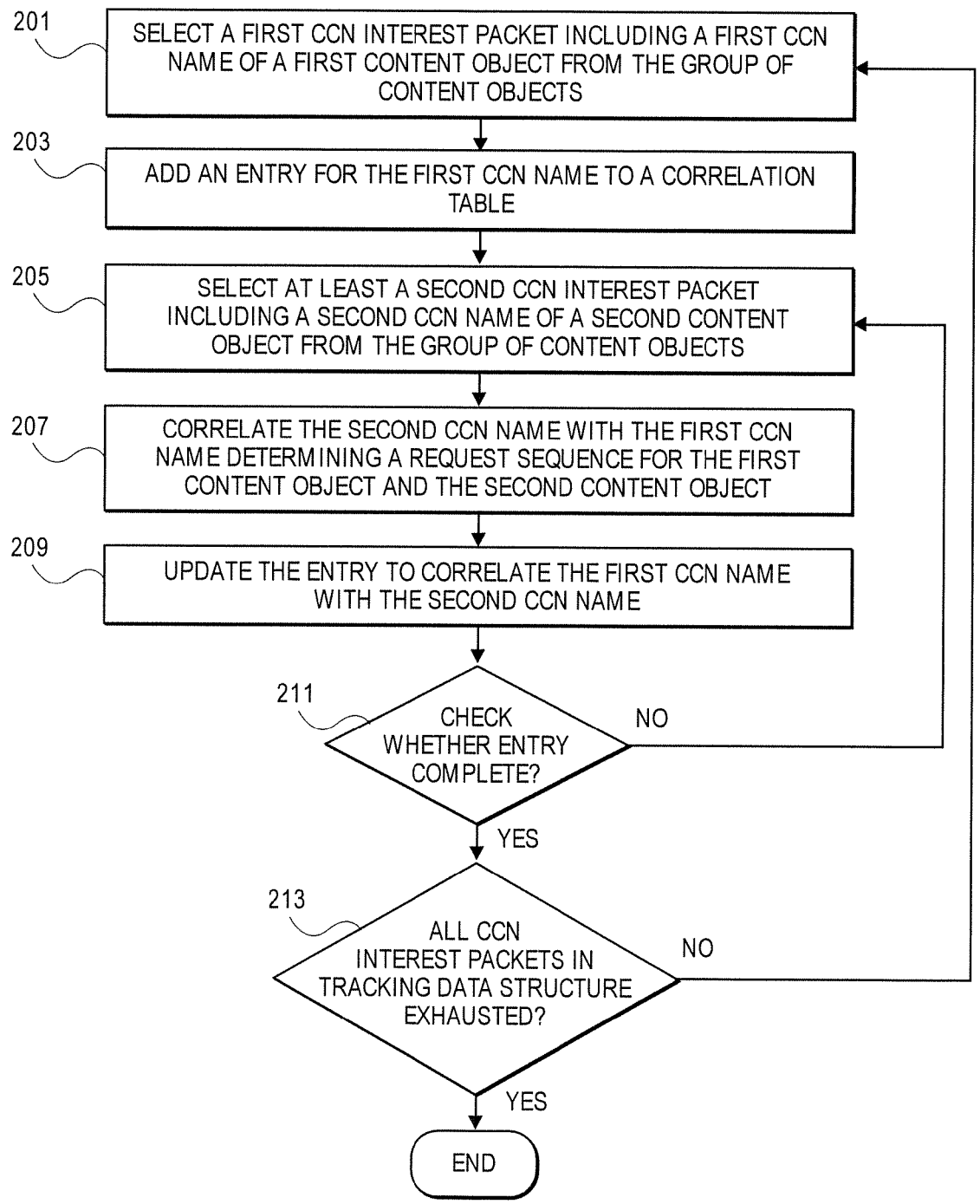
FIG. 2 is a flowchart of one embodiment of a process for temporal caching analysis implemented at a CCN gateway.

FIG. 2 is a diagram of one embodiment of a process for constructing a correlation table for temporal caching analysis. The process assumes that sequences of CCN interest packets have been tracked for given time sequences or within a set of time windows. The process then begins by selection of a first CCN interest packet originating from a user equipment (Block 201) from the tracking data structure. Each CCN interest packet includes a CCN name for a content object available in the CCN network, where that content object is provided initially by a content server, but may be subsequently cached at other CCN nodes in the network. The content object can be a member of a group of related content objects such as a set of streamed objects. In response to selecting this CCN interest packet from the tracking data structure, an entry can be added for the first CCN name in a correlation table (Block 203). This process may remove or similarly mark selected CCN interest packets as processed in the tracking data structure to prevent duplication in the correlation table being created. The selected CCN interest packet can be tracked in any type of data structures that enable subsequent analysis to determine patterns in a stream of content object requests received from user equipment. The requests for content objects do not need to originate from the same user equipment; rather, the patterns can be determined (e.g., detected) across any number of separate user equipment. The added correlation table entry can include the CCN name of the content object identified in the CCN interest packet or similar content object identifier.

The process continues with a selection of a second CCN interest packet (Block 205) from the tracking data structure. The second CCN interest packet includes a second CCN name for a second content object from the group of content objects. The second CCN interest packet can be selected based on a sequential pattern in relation to the first CCN interest packet depending on the type of correlation table being constructed. For example, if a three look ahead correlation table is being constructed, then for each CCN interest packet analyzed, the subsequent two CCN interest packets are selected and the three selected CCN interest packets are used to create and add a single entry in the correlation table with the first CCN name being associated with the second CCN names as set forth in the examples above.

In the illustrated example process of FIG. 2, the second CCN name can then be correlated with the first CCN name by determining (e.g., deriving) a request sequence for the first content object and second content object (Block 207). In scenarios where the differing types of rules or models for determining the requesting sequence are used, then the process may operate over any number of CCN interest packets and associated content objects rather than over two or any other subset of the tracked CCN interest packets. The selection of the CCN interest packets for processing and the number of iterations thus follow the defined rules or models, such as association rules or n-gram models discussed herein above.

The process continues to iterate over the tracked CCN interest packets until all of the CCN interest packets in a tracking data structure or that are associated with a given time window are processed. This is shown in the illustrated process with a first check to determine whether a current entry in the correlation table is complete (Block 211), where a number of subsequent CCN interest packets have been examined. Once the entry is complete (Yes branch of Block 211), then the process checks whether all of the CCN interest packets in the tracking data structure have been processed (Block 213). If the entry is not complete (No branch of Block 211), the process continues to add another entry for the next CCN interest packet, at which point that CCN interest packet may be removed from the tracking data structure, with this process continuing to iterate until all CCN interest packets in the tracking data structure are exhausted (i.e., have been processed to create a correlated entry in the correlation table) (Yes branch of Block 213).

Consolidating Correlation Tables

Figure 3:
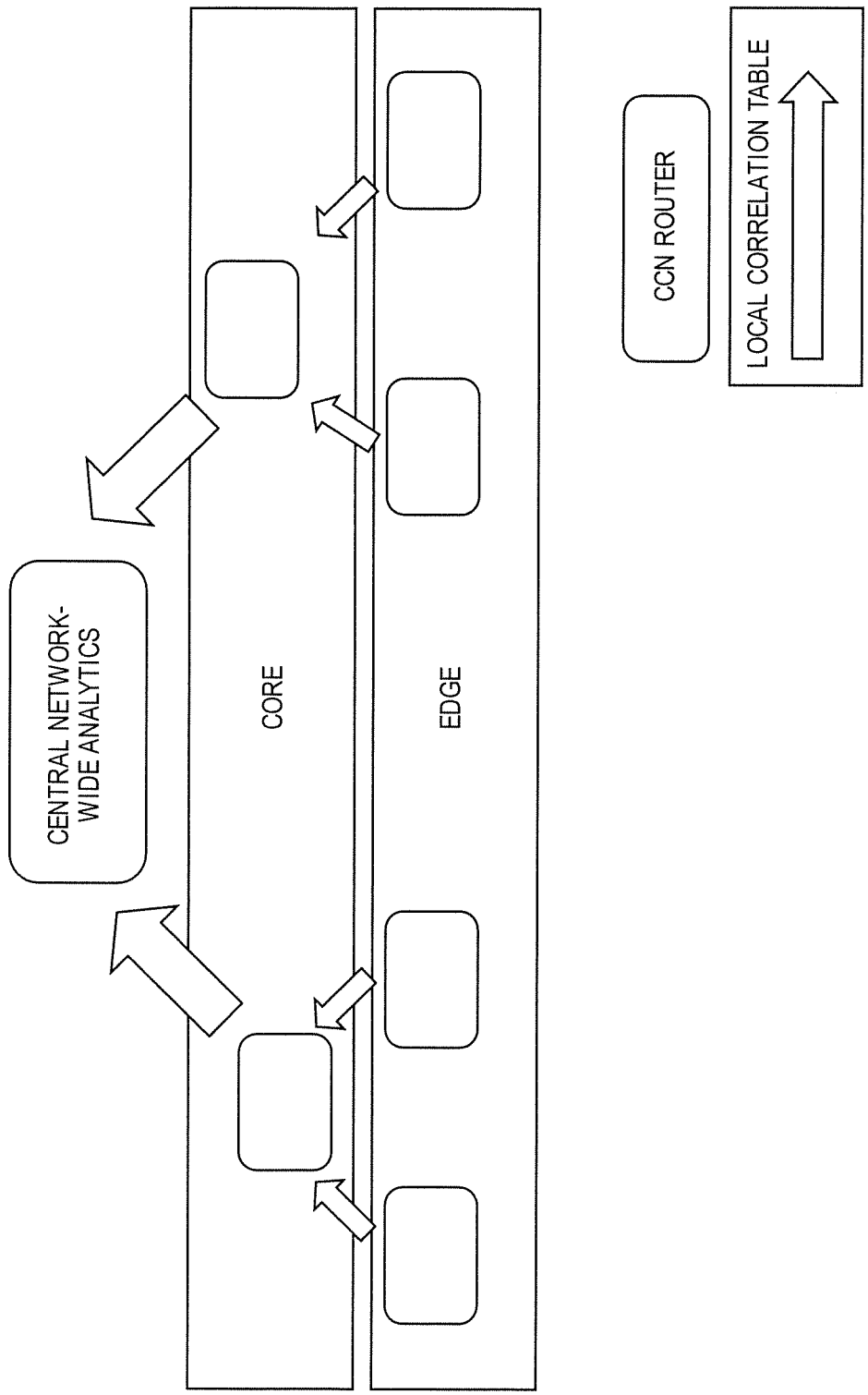
FIG. 3 is a diagram of a hierarchical consolidation of correlation tables across the network.

FIG. 3 is a diagram of a hierarchical consolidation of correlation tables across the network. In one embodiment, scaling of the temporal caching system is achieved by using localized data analytics that are consolidated hierarchically towards the core of the network. FIG. 3 illustrates a scheme in which each CCN node at the edge builds correlation tables as described herein above for end-user content access using association rules, n-gram models or similar techniques. These tables are then hierarchically consolidated at every tier in the CCN network. Although there are many heuristics through which rules may be consolidated, the simplest and most bandwidth efficient method would be to absorb rules that appear repeatedly. This improves the likelihood that pre-fetching will achieve a high hit ratio when this content is accessed in a different part of the network.

In one embodiment, the CCNx Sync protocol can be utilized for the exchange of data for such a consolidation process. The CCNx Sync protocol allows CCN components and applications to define collections of named data in repositories that are automatically kept in sync with identically defined collections in neighboring repositories. It can be configured such that the CCN nodes at different tiers can be kept updated using this CCNx Sync protocol, thus storing and updating correlation tables as named data.

Figure 4:
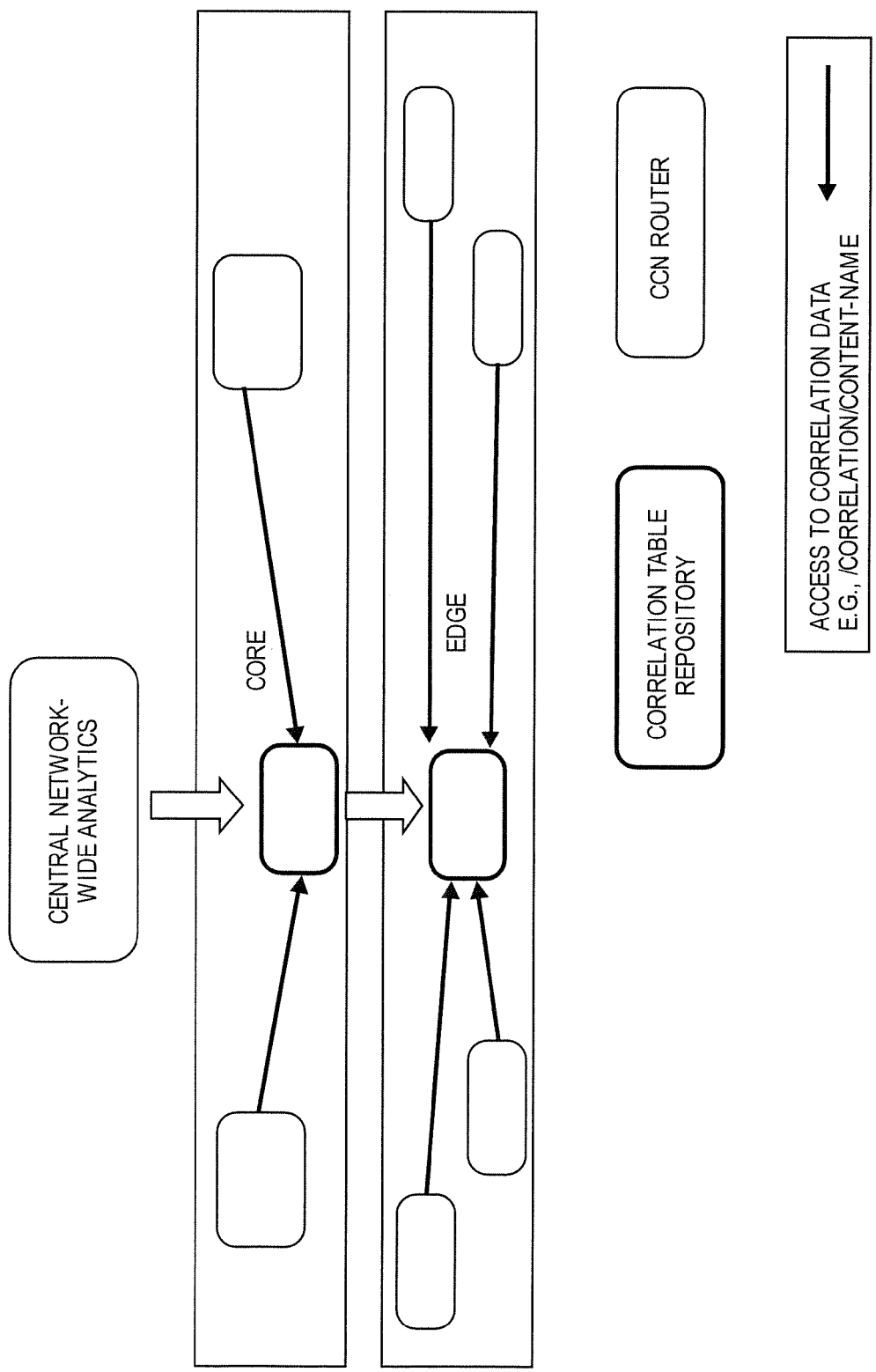
FIG. 4 is a diagram of another embodiment of a process for temporal caching analysis synchronization.

FIG. 4 is a diagram further describing an embodiment for the synchronization of correlation tables across the network for temporal caching analysis. Each tier in the clustering hierarchy may publish its own correlation tables based on its consolidated analysis. There are many possible ways to disseminate the correlation tables down to nodes at different levels from the core network, with respective trade-offs. A first effective way of scaling is to allot dedicated repositories that can handle requests for correlation tables that are routed via a path/correlation-data/content-name; this retrieves one of the rows in a correlation table. In-order to allow each tier/cluster to have independent correlation data, the path can be augmented with an additional component: /correlation-data/content-name/tier_xx/. Individual CCN routers can use the CCNx Sync protocol to subscribe to data in multiple tiers as they see fit. Depending upon the domain-specific network traffic, each CCN router may only request to be synced with a subset of the correlation tables. A CCN router attempting to perform pre-fetching looks up its local correlation table. If the CCN router finds no matching entry, it attempts to look up the same table at each tier above it, and if none are found, the CCN router eventually reads from the global table. There are two benefits from this approach. The first benefit is scaling, wherein, by allowing correlation tables to be consolidated in a tiered hierarchy, the most repetitive patterns are stored in tables at the highest layers and the least repetition occurs at the lowest levels, allowing the system to keep more distinct correlation tables. The second benefit is that the implicit feature of this tier approach allows 'regional' correlation patterns to be captured locally, i.e., two closely related sub-domains can share their 'regional' pattern at the next immediate tier.

One skilled in the art would understand that this tiered model is an example embodiment providing one possible solution. There are numerous approaches to correlation table consolidation, each a trade-off between storage and bandwidth. For example, in another embodiment, a central model with a monolithic data analytics engine would take in all the router's data, process correlation tables and redistribute data. Storage would be more optimal and data synchronization simplified. However, in this embodiment, total bandwidth usage would suffer and it would scale poorly.

Thus, the afore-mentioned techniques and processes provide a temporal caching methodology that complements CCN's implicit spatial caching. The central idea is to use request correlation between content objects to pre-fetch content objects in advance and move them closer to a CCN node that is closer to the end user equipment that is requesting the set of related content objects. Subsequent requests from the same source will have a high likelihood of being serviced from the pre-fetched set of content objects in the local contents store.

The inference of correlation between content objects can be learned via data analytics both at each local CCN node and using a hierarchical clustered learning model. The correlation engines, i.e., the temporal caching analysis modules, of each CCN node publish a correlation table that maps a content object to a related set of content objects (e.g., or a CCN name associated with such content objects). Optionally, the content server may publish the correlation table (e.g., as a manifest or similar data structure) which could be used directly by the end-node servicing the CCN request or the correlation engine.

A CCN node such as a CCN router or CCN gateway servicing an end-user content request can obtain the entry for correlated objects in a locally stored and synchronized correlation table and pre-fetch content objects ahead of time. Thus, these techniques introduce the notion of 'temporal' caching into the CCN system. Correlated content mappings can be shared across the entire network and reduce latency of content object access across the system.

The operations of the flow diagrams have been described with reference to the exemplary embodiment of the block diagrams. However, it should be understood that the operations of the flowcharts could be performed by embodiments of the invention other than those discussed, and the embodiments discussed with reference to block diagrams can perform operations different from those discussed with reference to the flowcharts. While the flowcharts show a particular order of operations performed by certain embodiments, it should be understood that such order is exemplary (e.g., alternative embodiments may perform the operations in a different order, combine certain operations, overlap certain operations, etc.).

Architecture

Figure 5:
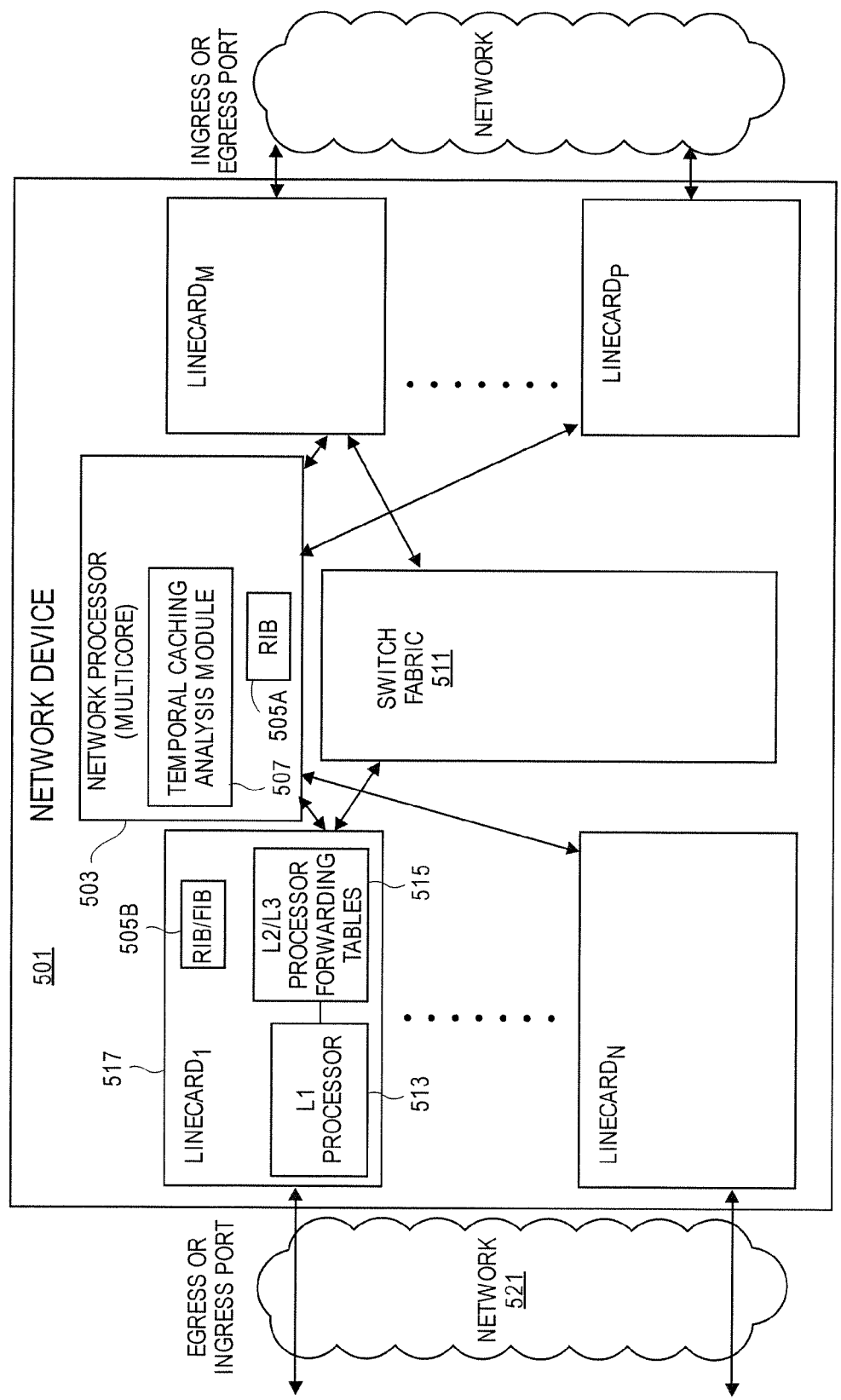
FIG. 5 is a diagram of one embodiment of a network device (ND) implementing a process for temporal caching analysis.

FIG. 5 is a diagram of one embodiment of a network device implementing the temporal caching process and system. A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

In one embodiment, the temporal caching process is implemented by a network device 501 or similar computing device. The network device 501 can have any structure that enables it to receive data traffic and forward it toward its destination. The network device 501 can include a network processor 503 or set of network processors that execute the functions of the network device 501. A 'set,' as used herein, is any positive whole number of items including one item. The network device 501 can execute a temporal caching analysis module 507 to implement the functions of generating and maintaining local correlation tables for identifying cases for pre-fetching content objects to be stored in the local content store when the network device 501 functions as a CCN gateway or similar CCN node as described herein above via a network processor 503.

The network device 501 connects with separately administered networks that have user equipment and/or content servers. The network processor 503 can implement the temporal caching analysis module 507 as a discrete hardware, software module or any combination thereof. The network processor 503 can also service the routing information base 505A and similar functions related to data traffic forwarding and network topology maintenance. The routing information base 505A can be implemented as match action tables that are utilized for forwarding protocol data units PDUs (i.e. packets). The functions of the temporal caching analysis module 507 can be implemented as modules in any combination of software, including firmware, and hardware within the network device. The functions of the temporal caching analysis module 507 that are executed and implemented by the network device 501 include those described further herein above including both the local correlation table maintenance and the synchronization of correlation table data within a CCN network.

In one embodiment, the network device 501 can include a set of line cards 517 that process and forward the incoming data traffic toward the respective destination nodes by identifying the destination and forwarding the data traffic to the appropriate line card 517 having an egress port that leads to or toward the destination via a next hop. These line cards 517 can also implement the forwarding information base 505B, or a relevant subset thereof. The line cards 517 can also implement or facilitate the temporal caching analysis module 507 functions described herein above. The line cards 517 are in communication with one another via a switch fabric 511 and communicate with other nodes over attached networks 521 using Ethernet, fiber optic or similar communication links and media.

As described herein, operations performed by the network device 501 may refer to specific configurations of hardware such as application specific integrated circuits (ASICs) configured to perform certain operations or having a predetermined functionality, or software instructions stored in memory embodied in a non-transitory computer readable storage medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. One or more parts of an embodiment of the invention may be implemented using different combinations of software, firmware, and/or hardware.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical network interface(s) to establish network connections (to transmit and/or receive code and/or data using propagating signals) with other electronic devices. One or more parts of an embodiment of the invention may be implemented using different combinations of software, firmware, and/or hardware.

FIG. 6A illustrates connectivity between network devices (NDs) within an exemplary network, as well as three exemplary implementations of the NDs, according to some embodiments of the invention. FIG. 6A shows NDs 600A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 600A, E, and F illustrates that these NDs act as ingress and egress points for the network (and thus, these NDs are sometimes referred to as edge NDs; while the other NDs may be called core NDs).

Two of the exemplary ND implementations in FIG. 6A are: 1) a special-purpose network device 602 that uses custom application-specific integrated circuits (ASICs) and a proprietary operating system (OS); and 2) a general-purpose network device 604 that uses common off-the-shelf (COTS) processors and a standard OS.

The special-purpose network device 602 includes networking hardware 610 comprising compute resource(s) 612 (which typically include a set of one or more processors), forwarding resource(s) 614 (which typically include one or more ASICs and/or network processors), and physical network interfaces (NIs) 616 (sometimes called physical ports), as well as non-transitory machine readable storage media 618 having stored therein networking software 620. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 600A-H. During operation, the networking software 620 may be executed by the networking hardware 610 to instantiate a set of one or more networking software instance(s) 622. Each of the networking software instance(s) 622, and that part of the networking hardware 610 that executes that network software instance (be it hardware dedicated to that networking software instance and/or time slices of hardware temporally shared by that networking software instance with others of the networking software instance(s) 622), form a separate virtual network element 630A-R. Each of the virtual network element(s) (VNEs) 630A-R includes a control communication and configuration module 632A-R (sometimes referred to as a local control module or control communication module) and forwarding table(s) 634A-R such that a given virtual network element (e.g., 630A) includes the control communication and configuration module (e.g., 632A), a set of one or more forwarding table(s) (e.g., 634A), and that portion of the networking hardware 610 that executes the virtual network element (e.g., 630A). In some embodiments, the control communication and configuration module 632A encompasses the temporal caching analysis module 633A as described herein above.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

The special-purpose network device 602 is often physically and/or logically considered to include: 1) a ND control plane 624 (sometimes referred to as a control plane) comprising the compute resource(s) 612 that execute the control communication and configuration module(s) 632A-R; and 2) a ND forwarding plane 626 (sometimes referred to as a forwarding plane, a data plane, or a media plane) comprising the forwarding resource(s) 614 that utilize the forwarding table(s) (i.e. implemented as match action tables) 634A-R and the physical NIs 616. By way of example, where the ND is a router (or is implementing routing functionality), the ND control plane 624 (the compute resource(s) 612 executing the control communication and configuration module(s) 632A-R) is typically responsible for participating in controlling how data (e.g., packets) are to be routed (e.g., the next hop for the data and the outgoing physical NI for that data) and storing that routing information in the forwarding table(s) 634A-R, and the ND forwarding plane 626 is responsible for receiving that data on the physical NIs 616 and forwarding that data out the appropriate ones of the physical NIs 816 based on the forwarding table(s) 634A-R.

FIG. 6B illustrates an exemplary way to implement the special-purpose network device 602 according to some embodiments of the invention. FIG. 6B shows a special-purpose network device including cards 838 (typically hot pluggable). While in some embodiments the cards 638 are of two types (one or more that operate as the ND forwarding plane 626 (sometimes called line cards), and one or more that operate to implement the ND control plane 624 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 636 (e.g., a first full mesh coupling the line cards and a second full mesh coupling all of the cards).

Returning to FIG. 6A, the general purpose network device 604 includes hardware 640 comprising a set of one or more processor(s) 642 (which are often COTS processors) and network interface controller(s) 644 (NICs; also known as network interface cards) (which include physical NIs 646), as well as non-transitory machine readable storage media 648 having stored therein software 650. During operation, the processor(s) 642 execute the software 650 to instantiate a hypervisor 654 (sometimes referred to as a virtual machine monitor (VMM)) and one or more virtual machines 662A-R that are run by the hypervisor 654, which are collectively referred to as software instance(s) 652. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 662A-R, and that part of the hardware 640 that executes that virtual machine (be it hardware dedicated to that virtual machine and/or time slices of hardware temporally shared by that virtual machine with others of the virtual machine(s) 662A-R), forms a separate virtual network element(s) 660A-R. In some embodiments, the virtual machine module 662A encompasses temporal caching analysis module 664A.

The virtual network element(s) 660A-R perform similar functionality to the virtual network element(s) 630A-R. For instance, the hypervisor 654 may present a virtual operating platform that appears like networking hardware 610 to virtual machine 662A, and the virtual machine 662A may be used to implement functionality similar to the control communication and configuration module(s) 632A and forwarding table(s) 634A (this virtualization of the hardware 640 is sometimes referred to as network function virtualization (NFV)). Thus, NFV may be used to consolidate many network equipment types onto industry standard high volume server hardware, physical switches, and physical storage, which could be located in Data centers, NDs, and customer premises equipment (CPE). However, different embodiments of the invention may implement one or more of the virtual machine(s) 662A-R differently. For example, while embodiments of the invention are illustrated with each virtual machine 662A-R corresponding to one VNE 660A-R, alternative embodiments may implement this correspondence at a finer level of granularity (e.g., line card virtual machines virtualize line cards, control card virtual machine virtualize control cards, etc.); it should be understood that the techniques described herein with reference to a correspondence of virtual machines to VNEs also apply to embodiments where such a finer level of granularity is used.

In certain embodiments, the hypervisor 654 includes a virtual switch that provides similar forwarding services as a physical Ethernet switch. Specifically, this virtual switch forwards traffic between virtual machines and the NIC(s) 644, as well as optionally between the virtual machines 662A-R; in addition, this virtual switch may enforce network isolation between the VNEs 660A-R that by policy are not permitted to communicate with each other (e.g., by honoring virtual local area networks (VLANs)).

The third exemplary ND implementation in FIG. 6A is a hybrid network device 606, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 602) could provide for para-virtualization to the networking hardware present in the hybrid network device 606.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 630A-R, VNEs 660A-R, and those in the hybrid network device 606) receives data on the physical NIs (e.g., 616, 646) and forwards that data out the appropriate ones of the physical NIs (e.g., 616, 646). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

FIG. 6C illustrates various exemplary ways in which VNEs may be coupled according to some embodiments of the invention. FIG. 6C shows VNEs 670A.1-670A.P (and optionally VNEs 670A.Q-670A.R) implemented in ND 600A and VNE 670H.1 in ND 600H. In FIG. 6C, VNEs 670A.1-P are separate from each other in the sense that they can receive packets from outside ND 600A and forward packets outside of ND 600A; VNE 670A.1 is coupled with VNE 670H.1, and thus they communicate packets between their respective NDs; VNE 670A.2-670A.3 may optionally forward packets between themselves without forwarding them outside of the ND 600A; and VNE 670A.P may optionally be the first in a chain of VNEs that includes VNE 670A.Q followed by VNE 670A.R (this is sometimes referred to as dynamic service chaining, where each of the VNEs in the series of VNEs provides a different service—e.g., one or more layer 4-7 network services). While FIG. 6C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 6A, for example, may form part of the Internet or a private network; and other electronic devices (not shown; such as end user devices including workstations, laptops, netbooks, tablets, palm tops, mobile phones, smartphones, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content server or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 6A may also host one or more such servers (e.g., in the case of the general purpose network device 604, one or more of the virtual machines 662A-R may operate as servers; the same would be true for the hybrid network device 606; in the case of the special-purpose network device 602, one or more servers could also be run on a hypervisor executed by the compute resource(s) 612); in which case the servers are said to be co-located with the VNEs of that ND.

A virtual network is a logical abstraction of a physical network (such as that in FIG. 6A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network-originated attacks, to avoid malformed route announcements), and management capabilities (e.g., full detection and processing).

FIG. 6D illustrates a network with a single network element on each of the NDs of FIG. 6A, and within this straight forward approach contrasts a traditional distributed approach (commonly used by traditional routers) with a centralized approach for maintaining reachability and forwarding information (also called network control), according to some embodiments of the invention. Specifically, FIG. 6D illustrates network elements (NEs) 670A-H with the same connectivity as the NDs 600A-H of FIG. 6A.

FIG. 6D illustrates that the distributed approach 672 distributes responsibility for generating the reachability and forwarding information across the NEs 670A-H; in other words, the process of neighbor discovery and topology discovery is distributed.

For example, where the special-purpose network device 602 is used, the control communication and configuration module(s) 632A-R of the ND control plane 624 typically include a reachability and forwarding information module to implement one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other NEs to exchange routes, and then selects those routes based on one or more routing metrics. Thus, the NEs 670A-H (e.g., the compute resource(s) 612 executing the control communication and configuration module(s) 632A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 624. The ND control plane 624 programs the ND forwarding plane 626 with information (e.g., adjacency and route information) based on the routing structure(s). For example, the ND control plane 624 programs the adjacency and route information into one or more forwarding table(s) 634A-R that are implementations of match action tables (e.g., Forwarding Information Base (FIB), Label Forwarding Information Base (LFIB), and one or more adjacency structures) on the ND forwarding plane 626. For layer 2 forwarding, the ND can store one or more bridging tables that are used to forward data based on the layer 2 information in that data. While the above example uses the special-purpose network device 602, the same distributed approach 672 can be implemented on the general purpose network device 604 and the hybrid network device 606.

FIG. 6D illustrates that a centralized approach 674 (also known as software defined networking (SDN)) that decouples the system that makes decisions about where traffic is sent from the underlying systems that forwards traffic to the selected destination. The illustrated centralized approach 674 has the responsibility for the generation of reachability and forwarding information in a centralized control plane 676 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 676 has a south bound interface 682 with a data plane 680 (sometime referred to the infrastructure layer, network forwarding plane, or forwarding plane (which should not be confused with a ND forwarding plane)) that includes the NEs 670A-H (sometimes referred to as switches, forwarding elements, data plane elements, or nodes). The centralized control plane 676 includes a network controller 678, which includes a centralized reachability and forwarding information module 679 that determines the reachability within the network and distributes the forwarding information to the NEs 670A-H of the data plane 680 over the south bound interface 682 (which may use the OpenFlow protocol). Thus, the network intelligence is centralized in the centralized control plane 676 executing on electronic devices that are typically separate from the NDs.

For example, where the special-purpose network device 602 is used in the data plane 680, each of the control communication and configuration module(s) 632A-R of the ND control plane 624 typically include a control agent that provides the VNE side of the south bound interface 682. In this case, the ND control plane 624 (the compute resource(s) 612 executing the control communication and configuration module(s) 632A-R) performs its responsibility for participating in controlling how data (e.g., packets) is to be routed (e.g., the next hop for the data and the outgoing physical NI for that data) through the control agent communicating with the centralized control plane 676 to receive the forwarding information (and in some cases, the reachability information) from the centralized reachability and forwarding information module 679 (it should be understood that in some embodiments of the invention, the control communication and configuration module(s) 632A-R, in addition to communicating with the centralized control plane 676, may also play some role in determining reachability and/or calculating forwarding information—albeit less so than in the case of a distributed approach; such embodiments are generally considered to fall under the centralized approach 674, but may also be considered a hybrid approach). In some embodiments, the centralized reachability and forwarding module 679 encompasses temporal caching functions in temporal caching analysis module 681 as described herein above.

While the above example uses the special-purpose network device 602, the same centralized approach 674 can be implemented with the general purpose network device 604 (e.g., each of the VNE 660A-R performs its responsibility for controlling how data (e.g., packets) is to be routed (e.g., the next hop for the data and the outgoing physical NI for that data) by communicating with the centralized control plane 676 to receive the forwarding information (and in some cases, the reachability information) from the centralized reachability and forwarding information module 679; it should be understood that in some embodiments of the invention, the VNEs 660A-R, in addition to communicating with the centralized control plane 676, may also play some role in determining reachability and/or calculating forwarding information—albeit less so than in the case of a distributed approach) and the hybrid network device 606. In fact, the use of SDN techniques can enhance the NFV techniques typically used in the general purpose network device 604 or hybrid network device 606 implementations as NFV is able to support SDN by providing an infrastructure upon which the SDN software can be run, and NFV and SDN both aim to make use of commodity server hardware and physical switches.

FIG. 6D also shows that the centralized control plane 676 has a north bound interface 684 to an application layer 686, in which resides application(s) 688. The centralized control plane 676 has the ability to form virtual networks 692 (sometimes referred to as a logical forwarding plane, network services, or overlay networks (with the NEs 670A-H of the data plane 680 being the underlay network)) for the application(s) 688. Thus, the centralized control plane 676 maintains a global view of all NDs and configured NEs/VNEs, and it maps the virtual networks to the underlying NDs efficiently (including maintaining these mappings as the physical network changes either through hardware (ND, link, or ND component) failure, addition, or removal). The application layer 686 thus enables the execution of applications that manage or interact with the functions associated with the network elements, this can include the implementation of the temporal caching synchronization module 687 that implements the functions of a network wide analysis for purposes of the synchronization and correlation of correlation table data across the nodes of the SDN in a hierarchical or similar configuration of the nodes. In some embodiments, the temporal caching synchronization module 687 can communicate with the local temporal caching analysis module to effect such synchronization.

While FIG. 6D shows the distributed approach 672 separate from the centralized approach 674, the effort of network control may be distributed differently or the two combined in certain embodiments of the invention. For example: 1) embodiments may generally use the centralized approach (SDN) 674, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 674, but may also be considered a hybrid approach.

While FIG. 6D illustrates the simple case where each of the NDs 600A-H implements a single NE 670A-H, it should be understood that the network control approaches described with reference to FIG. 6D also work for networks where one or more of the NDs 600A-H implement multiple VNEs (e.g., VNEs 630A-R, VNEs 660A-R, those in the hybrid network device 606). Alternatively or in addition, the network controller 678 may also emulate the implementation of multiple VNEs in a single ND. Specifically, instead of (or in addition to) implementing multiple VNEs in a single ND, the network controller 678 may present the implementation of a VNE/NE in a single ND as multiple VNEs in the virtual networks 692 (all in the same one of the virtual network(s) 692, each in different ones of the virtual network(s) 692, or some combination). For example, the network controller 678 may cause an ND to implement a single VNE (a NE) in the underlay network, and then logically divide up the resources of that NE within the centralized control plane 676 to present different VNEs in the virtual network(s) 692 (where these different VNEs in the overlay networks are sharing the resources of the single VNE/NE implementation on the ND in the underlay network).

On the other hand, FIGS. 6E and 6F respectively illustrate exemplary abstractions of NEs and VNEs that the network controller 678 may present as part of different ones of the virtual networks 692. FIG. 6E illustrates the simple case of where each of the NDs 600A-H implements a single NE 670A-H (see FIG. 6D), but the centralized control plane 676 has abstracted multiple of the NEs in different NDs (the NEs 670A-C and G-H) into (to represent) a single NE 6701 in one of the virtual network(s) 692 of FIG. 6D, according to some embodiments of the invention. FIG. 6E shows that in this virtual network, the NE 6701 is coupled to NE 670D and 670F, which are both still coupled to NE 670E.

FIG. 6F illustrates a case where multiple VNEs (VNE 670A.1 and VNE 670H.1) are implemented on different NDs (ND 600A and ND 600H) and are coupled to each other, and where the centralized control plane 676 has abstracted these multiple VNEs such that they appear as a single VNE 670T within one of the virtual networks 692 of FIG. 6D, according to some embodiments of the invention. Thus, the abstraction of a NE or VNE can span multiple NDs.

While some embodiments of the invention implement the centralized control plane 676 as a single entity (e.g., a single instance of software running on a single electronic device), alternative embodiments may spread the functionality across multiple entities for redundancy and/or scalability purposes (e.g., multiple instances of software running on different electronic devices).

Figure 7:
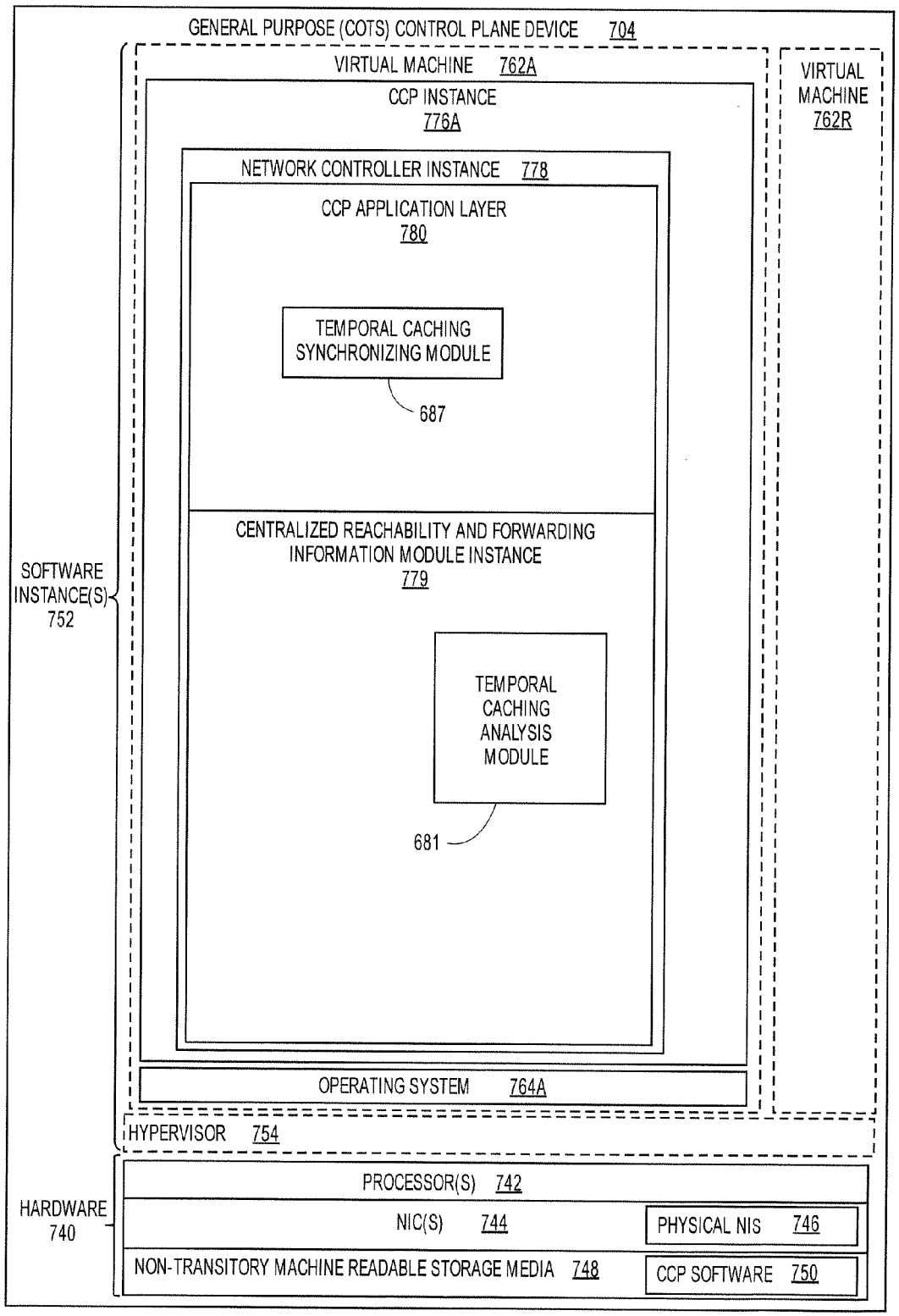
FIG. 7 illustrates a general purpose control plane device including hardware comprising a set of one or more processor(s) (which are often Commercial off-the-shelf (COTS) processors) and network interface controller(s) (NICs; also known as network interface cards) (which include physical NIs), as well as non-transitory machine readable storage media having stored therein centralized control plane (CCP) software), according to some embodiments of the invention.

Similar to the network device implementations, the electronic device(s) running the centralized control plane 676, and thus the network controller 678 including the centralized reachability and forwarding information module 679, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 7 illustrates, a general purpose control plane device 704 including hardware 740 comprising a set of one or more processor(s) 742 (which are often COTS processors) and network interface controller(s) 744 (NICs; also known as network interface cards) (which include physical NIs 746), as well as non-transitory machine readable storage media 748 having stored therein centralized control plane (CCP) software 750.

In embodiments that use compute virtualization, the processor(s) 742 typically execute software to instantiate a hypervisor 754 (sometimes referred to as a virtual machine monitor (VMM)) and one or more virtual machines 762A-R that are run by the hypervisor 754; which are collectively referred to as software instance(s) 752. A virtual machine is a software implementation of a physical machine that runs programs as if they were executing on a physical, non-virtualized machine; and applications generally are not aware they are running on a virtual machine as opposed to running on a "bare metal" host electronic device, though some systems provide para-virtualization which allows an operating system or application to be aware of the presence of virtualization for optimization purposes. Again, in embodiments where compute virtualization is used, during operation an instance of the CCP software 750 (illustrated as CCP instance 776A) on top of an operating system 764A are typically executed within the virtual machine 762A. In embodiments where compute virtualization is not used, the CCP instance 776A on top of operating system 764A is executed on the "bare metal" general purpose control plane device 704.

The operating system 764A provides basic processing, input/output (I/O), and networking capabilities. In some embodiments, the CCP instance 776A includes a network controller instance 778. The network controller instance 778 includes a centralized reachability and forwarding information module instance 779 (which is a middleware layer providing the context of the network controller 778 to the operating system 764A and communicating with the various NEs), and an CCP application layer 780 (sometimes referred to as an application layer) over the middleware layer (providing the intelligence required for various network operations such as protocols, network situational awareness, and user-interfaces). At a more abstract level, this CCP application layer 780 within the centralized control plane 776 works with virtual network view(s) (logical view(s) of the network) and the middleware layer provides the conversion from the virtual networks to the physical view. The CCP application can encompass the functionality of the temporal caching analysis module 781 as described herein above. Similarly, the CCP application layer 780 can implement the temporal caching synchronization module 687 in addition to the other applications 688.

The centralized control plane 776 transmits relevant messages to the data plane 680 based on CCP application layer 780 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 680 may receive different messages, and thus different forwarding information. The data plane 680 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Of course, the present invention may be carried out in other specific ways than those herein set forth without departing from the scope and essential characteristics of the invention. One or more of the specific processes discussed above may be carried out using one or more appropriately configured processing circuits. In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

The invention claimed is:

1. A method for providing temporal caching in a content centric networking (CCN) network, the temporal caching implemented by a network device functioning as a CCN node, the method to fetch and cache a group of content objects having a temporal relationship, the method comprising the steps of:
   selecting a first CCN interest packet including a first CCN name of a first content object from the group of content objects;
   adding an entry for the first CCN name to a correlation table;
   selecting at least a second CCN interest packet including a second CCN name of a second content object from the group of content objects;
   correlating the second CCN name with the first CCN name by determining a request sequence for the first content object and the second content object, where a request sequence is a temporal order in which each request in the sequence is made;
   updating the entry to correlate the first CCN name with the second CCN name; and
   receiving an update to the correlation table, wherein the update includes consolidated correlation table data determined from other correlation tables generated by other CCN nodes in the CCN network.

2. The method of claim 1, further comprising the step of:
   in response to receiving the first CCN interest packet including the first CCN name of the first content object, fetching the second content object from a content server to be stored in a local content store of the CCN node.

3. The method of claim 1, wherein correlating the second CCN name with the first CCN name is based on application of association rules.

4. The method of claim 1, wherein correlating the second CCN name with the first CCN name is based on application of an n-gram model.

5. The method of claim 1, further comprising the step of:
   forwarding the entry for the first CCN name to a higher hierarchical level to be consolidated with other correlation table data.

6. The method of claim 1, further comprising the step of:
   synchronizing the correlation table with a CCN synchronization protocol for collections of named data in repositories.

7. A network device to implement a method for providing temporal caching in a content centric networking (CCN) network, the network device implementing a CCN node, the method to fetch and cache a group of content objects having a temporal relationship, the network device comprising:
   a non-transitory computer-readable medium having stored therein a temporal caching analysis module; and
   a processor coupled to the non-transitory computer-readable medium, the processor configured to execute the temporal caching analysis module, the temporal caching analysis module configured to select a first CCN interest packet including a first CCN name of a first content object from the group of content objects, to add an entry for the first CCN name to a correlation table, to select at least a second CCN interest packet including a second CCN name of a second content object from the group of content objects, to correlate the second CCN name with the first CCN name by determining a request sequence for the first content object and the second content object, where a request sequence is a temporal order in which each request in the sequence is made, and to update the entry to correlate the first CCN name with the second CCN name, wherein the update includes consolidated correlation table data determined from other correlation tables generated by other CCN nodes in the CCN network.

8. The network device of claim 7, wherein the temporal caching analysis module is further configured to fetch the second content object from a content server to be stored in a local content store of the network device in response to receiving the first CCN interest packet including the first CCN name of the first content object.

9. The network device of claim 7, wherein the temporal caching analysis module is configured to correlate the second CCN name with the first CCN name based on application of association rules.

10. The network device of claim 7, wherein the temporal caching analysis module is configured to correlate the second CCN name with the first CCN name based on application of an n-gram model.

11. The network device of claim 7, wherein the temporal caching analysis module is further configured to forward the entry for the first CCN name to a higher hierarchical level to be consolidated with other correlation table data.

12. The network device of claim 7, wherein the temporal caching analysis module is further configured to synchronize the correlation table with a CCN synchronization protocol for collections of named data in repositories.

13. A computing device to execute a plurality of virtual machines for implementing network function virtualization (NFV), wherein a virtual machine from the plurality of virtual machines is configured to execute a method for providing temporal caching in a content centric networking (CCN) network, the network device implementing a CCN node, the method to fetch and cache a group of content objects having a temporal relationship, the computing device comprising:
a non-transitory computer-readable medium having stored therein a temporal caching analysis module; and
a processor coupled to the non-transitory computer-readable medium, the processor configured to execute the virtual machine, the virtual machine configured to execute the temporal caching analysis module, the temporal caching analysis module configured to select a first CCN interest packet including a first CCN name of a first content object from the group of content objects, to add an entry for the first CCN name to a correlation table, to receive at least a second CCN interest packet including a second CCN name of a second content object from the group of content objects, to correlate the second CCN name with the first CCN name by determining a request sequence for the first content object and the second content object, where a request sequence is a temporal order in which each request in the sequence is made, and to update the entry to correlate the first CCN name with the second CCN name, wherein the update includes consolidated correlation table data determined from other correlation tables generated by other CCN nodes in the CCN network.

14. The computing device of claim 13, wherein the temporal caching analysis module is further configured to fetch the second content object from a content server to be stored in a local content store of the computing device in response to receiving the first CCN interest packet including the first CCN name of the first content object.

15. The computing device of claim 13, wherein the temporal caching analysis module is configured to correlate the second CCN name with the first CCN name based on application of association rules.

16. The computing device of claim 13, wherein the temporal caching analysis module is configured to correlate the second CCN name with the first CCN name based on application of an n-gram model.

17. The computing device of claim 13, wherein the temporal caching analysis module is further configured to forward the entry for the first CCN name to a higher hierarchical level to be consolidated with other correlation table data.

18. The computing device of claim 13, wherein the temporal caching analysis module is further configured to synchronize the correlation table with a CCN synchronization protocol for collections of named data in repositories.

19. A control plane device to implement a control plane of a software defined networking (SDN) network, the SDN network including a plurality of network devices implementing the data plane of the SDN network, wherein control plane device is configured to execute a method for providing temporal caching in a content centric networking (CCN) network, the method to fetch and cache a group of content objects having a temporal relationship, the control plane device comprising:
a non-transitory computer-readable medium having stored therein a temporal caching analysis module; and
a processor coupled to the non-transitory computer-readable medium, the processor configured to execute the temporal caching analysis module, the temporal caching analysis module configured to select a first CCN interest packet including a first CCN name of a first content object from the group of content objects, to add an entry for the first CCN name to a correlation table, to select at least a second CCN interest packet including a second CCN name of a second content object from the group of content objects, to correlate the second CCN name with the first CCN name by determining a request sequence for the first content object and the second content object, where a request sequence is a temporal order in which each request in the sequence is made, and to update the entry to correlate the first CCN name with the second CCN name, wherein the update includes consolidated correlation table data determined from other correlation tables generated by other CCN nodes in the CCN network.

* * * * *